United States Patent [19]
Smith

[11] Patent Number: 5,839,813
[45] Date of Patent: Nov. 24, 1998

[54] THIN REAR COMBINATION LAMP SYSTEM

[75] Inventor: Ronald T. Smith, Corona Del Mar, Calif.

[73] Assignee: Delco Electronics Corporation, Kokomo, Ind.

[21] Appl. No.: 720,582

[22] Filed: Oct. 2, 1996

[51] Int. Cl.⁶ ............................. F21V 7/04; B60Q 1/00
[52] U.S. Cl. ............................. 362/32; 362/31; 362/61
[58] Field of Search ................. 362/32, 61, 19, 362/31, 80

[56] References Cited

U.S. PATENT DOCUMENTS

| | | | |
|---|---|---|---|
| 4,212,048 | 7/1980 | Castleberry | 362/19 |
| 4,389,698 | 6/1983 | Cibie | 362/32 |
| 4,432,039 | 2/1984 | Cibie | 362/32 |
| 4,528,617 | 7/1985 | Blackington | 362/32 |
| 4,949,227 | 8/1990 | Finch et al. | 362/32 |
| 5,101,325 | 3/1992 | Davenport et al. | 362/32 |
| 5,184,883 | 2/1993 | Finch et al. | 362/61 |
| 5,222,793 | 6/1993 | Davenport et al. | 362/61 |
| 5,295,047 | 3/1994 | Windross | 362/32 |
| 5,343,367 | 8/1994 | Davenport et al. | 362/61 |
| 5,347,435 | 9/1994 | Smith et al. | 362/61 |
| 5,365,412 | 11/1994 | Koppolu et al. | 362/61 |
| 5,369,554 | 11/1994 | Erion | 362/32 |
| 5,434,754 | 7/1995 | Li et al. | 362/32 |
| 5,434,756 | 7/1995 | Hsu et al. | 362/32 |
| 5,488,545 | 1/1996 | Kato et al. | 362/61 |
| 5,515,244 | 5/1996 | Levins et al. | 362/32 |
| 5,692,091 | 11/1997 | Cassarly et al. | 362/32 |

*Primary Examiner*—Stephen F. Husar
*Assistant Examiner*—Matthew J. Spark
*Attorney, Agent, or Firm*—Jimmy L. Funke

[57] ABSTRACT

A vehicle exterior lamp system that includes a light source (11) for providing a plurality of beams, a plurality of optical fiber channels (17) responsive to the plurality of beams for providing a plurality of optical fiber channel outputs, a plurality of optical switches (15) for controlling the transmission of light by the plurality of optical fiber channels, and a plurality of rear exterior lamps (19) for projecting light received from the optical fiber channels to provide respective exterior lamp outputs.

12 Claims, 3 Drawing Sheets

THIN REAR COMBINATION LAMP SYSTEM

BACKGROUND OF THE INVENTION

The disclosed invention is directed generally to a rear exterior lamp system for a vehicle, and more particularly to a rear exterior lamp system having a remotely located light source.

Vehicles such as automobiles are required to have rear exterior lamps that function as rear lights, stop lights and turn signal lights. Taillamps are conventionally comprised of an incandescent bulb, a reflector, a colored lens, and a housing.

Considerations with conventional rear exterior vehicle lamps include size, weight, complexity, and the need to configure the rear structure of a vehicle to accommodate the thickness of the rear exterior lamp. Another consideration with conventional rear exterior lamps is the use of a dedicated light bulb adjacent the light emitting elements.

SUMMARY OF THE INVENTION

It would therefore be an advantage to provide a vehicle exterior lamp system having a light source that provides light for a plurality of thin exterior lamps.

Another advantage would be to provide a rear exterior lamp having a remotely located light source that provides light for a plurality of exterior lamps.

The foregoing and other advantages are provided by the invention in a vehicle exterior lamp system that includes a light source for providing a plurality of beams, a plurality of optical fiber channels responsive to the plurality of beams for providing a plurality of optical fiber channel outputs, a plurality of optical switches for controlling the transmission of light by the plurality of optical fiber channels, and a plurality of rear exterior lamps for projecting light received from the optical fiber channels to provide respective exterior lamp outputs.

BRIEF DESCRIPTION OF THE DRAWINGS

The advantages and features of the disclosed invention will readily be appreciated by persons skilled in the art from the following detailed description when read in conjunction with the drawing wherein.

DETAILED DESCRIPTION OF THE DISCLOSURE

Figure 1:
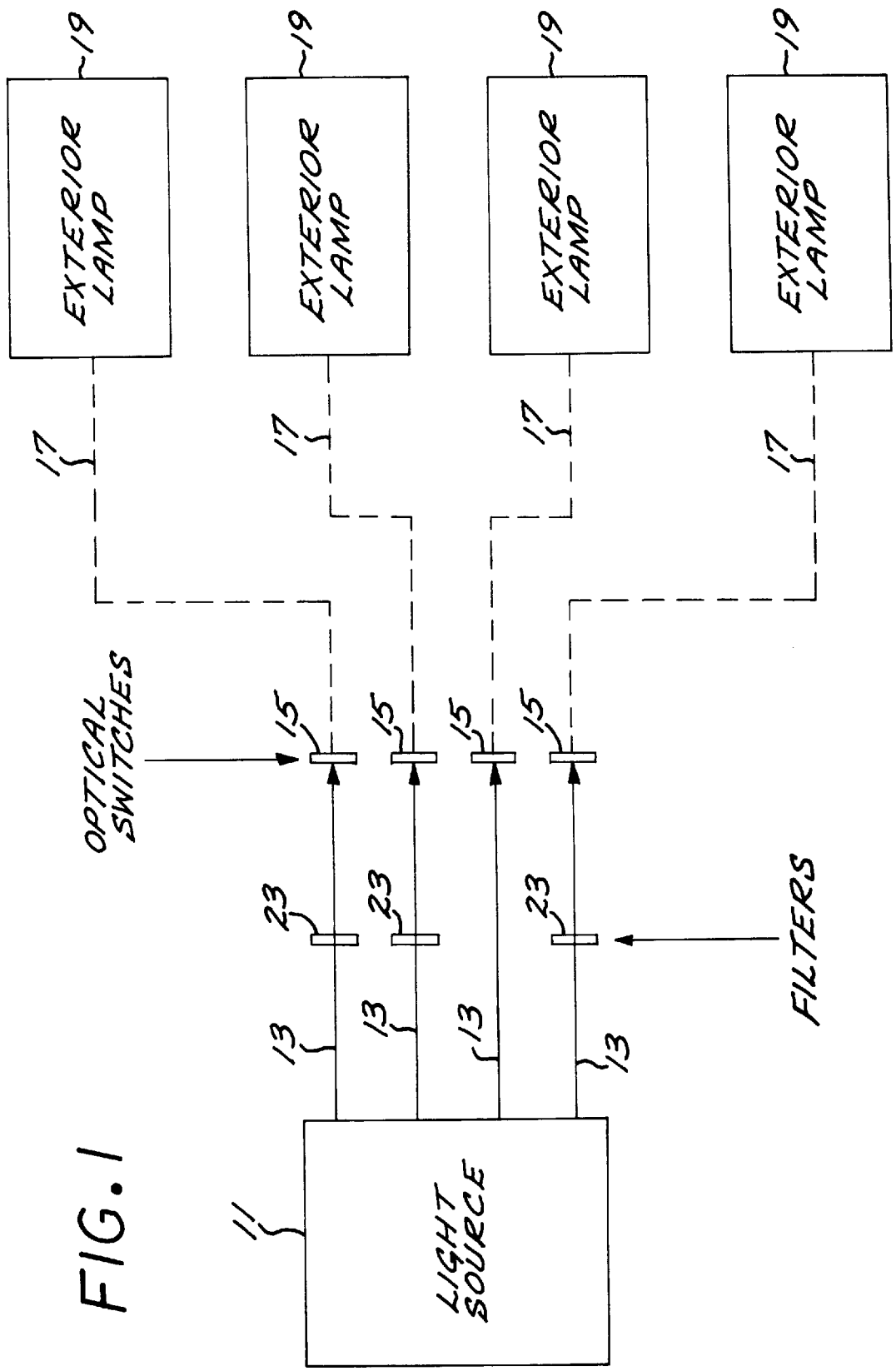
FIG. 1 is a block diagram of a distributed exterior lamp system in accordance with the invention.

In the following detailed description and in the several figures of the drawing, like elements are identified with like reference numerals.

Referring now to FIG. 1, set forth therein is a distributed exterior lamp system in accordance with the invention. A high intensity light source 11 provides a plurality of beams 13 to a plurality of optical switches 15 whose light outputs are provided to a plurality of optical fiber channels 17. The outputs of the optical fiber channels 17 are respectively provided to inputs of a plurality of rear exterior lamps 19 which project light received from the optical fiber channels. Color filters 23 of appropriate colors are located in the paths of selected ones of the beams 13 provided by the light source 11, as required to achieve the desired color outputs of the exterior lamps 19.

By way of illustrative example, the high intensity light source is a high intensity discharge bulb and a multifaceted reflector that focuses light from the bulb to the input apertures of a plurality of quartz optical couplers that form part of optical fiber channels 17. The optical switches comprise for example solenoid actuated optical shutters located adjacent the input apertures of the quartz optical couplers, and the filters 23 would be located in the paths of the focused beams provided by the multi-faceted reflector.

Each of the optical fiber channels 17 comprises for example the previously mentioned quartz couplers, multi-fiber optical cables coupled to the outputs of the quartz couplers, and solid optical fibers coupled to the outputs of the multi-fiber optical cables.

The optical switches 15 can alternatively be implemented as polymer dispersed liquid crystal (PDLC) optical switches or dichroic LCD switches appropriately disposed in the optical fiber channels 17.

Figure 2:
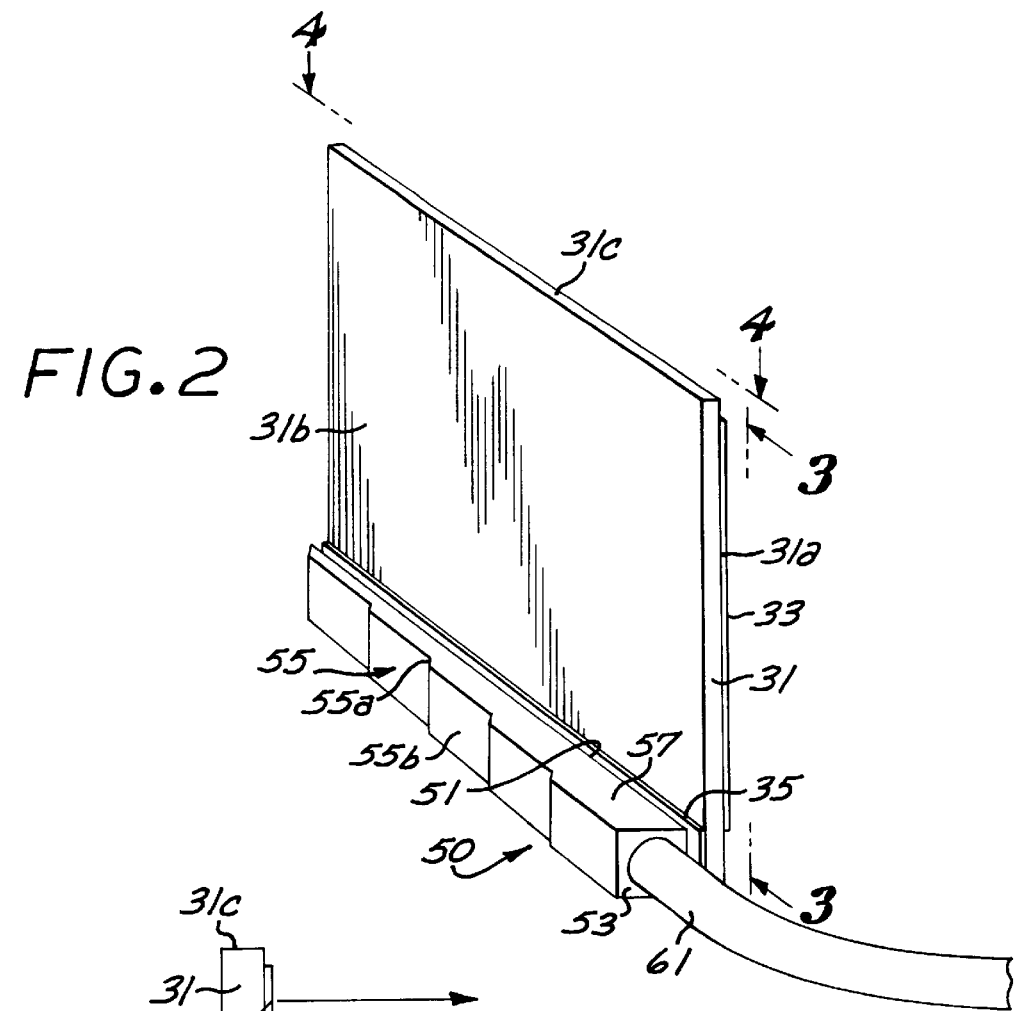
FIG. 2 is a schematic perspective view of a rear exterior vehicle lamp that can be utilized in the distributed exterior lamp system of FIG. 1.
Figure 3:
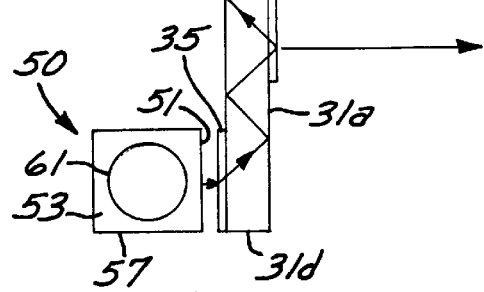
FIG. 3 is a schematic side elevational view of the rear exterior vehicle lamp of FIG. 2.

Referring now to FIGS. 2 and 3, schematically set forth therein are a perspective view and side elevational view of a of an illustrative example of a holographic rear exterior lamp that can utilized as a rear exterior lamp 19 in the distributed exterior lamp system of FIG. 1. The holographic rear exterior lamp includes a thin, flat transparent light pipe 31 having a first planar surface 31a and a second planar surface 31b that is opposite and parallel to the first planar surface 31a. A narrow top surface 31c extends between adjacent top edges of the first planar surface 31a and the second planar surface 31b, while a narrow bottom surface 31d extends between adjacent bottom edges of the first planar surface 31a and the second planar surface 31b. A rear exterior lamp hologram 33 is laminarly attached in an index matching manner to the first planar surface 31a adjacent the narrow top surface 31c of the light pipe 31, and extends downwardly, for example past the vertical center between the narrow top surface 31c of the light pipe 31 and the narrow bottom surface 31d of the light pipe 31.

The holographic rear exterior lamp further includes an input coupling volume transmission hologram 35 that is laminarly attached in an index matching manner to the second planar surface 31b adjacent the lower edge of the light pipe 31. The input coupling hologram 35 is illuminated with a reconstruction beam that is provided by the output of a tapered optical coupler 50.

The input coupling hologram 35 diffracts the reconstruction illumination incident thereon into the light pipe 31 at an upwardly directed angle that is appropriate for total internal reflection within the light pipe 31 and the hologram 33, such that a portion of the light that is diffracted by the input coupling hologram 35 propagates upwardly within the light pipe 31 and the hologram 33. The rear exterior lamp hologram 33 diffracts a portion of the trapped light as rear exterior illumination, whereby the light pipe 31, the input coupling hologram 35, and the rear exterior lamp hologram 33 function as a light panel that provides rear exterior illumination in response to light that is communicated via the optical fiber 61 and the optical coupler 50.

Figure 4:
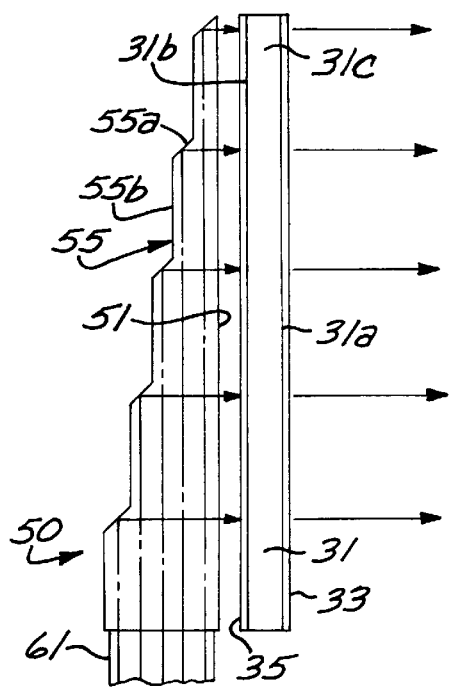
FIG. 4 is a schematic plan view of the optical coupler of the rear exterior vehicle lamp of FIG. 3.

As more particularly shown in FIG. 4, the tapered optical coupler 50 comprises a generally elongated substantially transparent substrate having an elongated planar output surface 51, an input side 53 for coupling light from an optical fiber 61 into the optical coupler 50, wherein the optical fiber 61 more particularly comprises a portion of one of the optical fiber channels 17, and an internally reflecting side 55 opposite the output surface 51 for reflecting toward the output surface 51 a portion of the light injected into the coupler 50 at the input side 53. The input side 53 can include a small indentation for assisting in the alignment of the end of the optical fiber 61 relative to the input side 53. The optical coupler 50 further includes opposing parallel sides 57 that extend from the longitudinal edges of the output surface 51 to the internally reflecting side 55. For example, the opposing parallel sides 57 are orthogonal to the output surface 51.

The reflective side 55 of the optical coupler 50 more particularly includes a plurality of parallel internally reflecting surfaces 55a which are orthogonal to a plane that is parallel to the longitudinal extent of the planar output surface 51 and orthogonal to the planar output surface 51, and are angularly disposed to generally face the input side 53 and the output surface 51 so as to reflect toward the output surface 51 light that is injected into the optical coupler 50 by the optical fiber 61. The parallel internally reflecting surfaces 55a are spaced apart along the longitudinal extent of the output surface 51, and are at stepwise progressively closer distances to the output surface 51 with increasing distance from the input side 53. The internally reflecting surfaces 55a are separated by separation surfaces 55b that are parallel to the output surface 51, whereby the internally reflecting surfaces 55a are adjoining when viewed along the longitudinal extent of the output surface 51.

Effectively, the reflective side 55 of the optical coupler 50 comprises a stepped surface having (a) a series of internally reflecting surfaces 55a that are located at positions that are stepwise closer to the output surface 51 with distance from the input side 53, and (b) a series of separation surfaces 55b that are parallel to the output surface 51 and interconnect adjacent edges of adjacent internally reflecting surfaces 55a.

By way of illustrative example, the optical fiber 61 and the input side 53 are configured so that the optical axis of the injected light in the optical coupler is parallel to the longitudinal extent of the output surface 51, and the internally reflecting surfaces 55a are about a 45 degree angle relative to the output surface 51.

The output surface 51 of the light coupler 50 is separated by a gap from the input coupling hologram 15 so that injected light in the optical coupler 50 is trapped by total internal reflection within the light coupler 50 until portions of the injected light are reflected toward the output surface 51 by the internally reflecting surfaces 55a. The internally reflecting surfaces 55a preferably span the extent of the input side 53, such that almost all of the injected light is reflected to the output surface 51. The light reflected by the internally reflecting surfaces 55a is preferably incident at the output surface 51 at close to normal, and thus almost all of the injected light reflected by the internally reflecting surfaces 55a is efficiently transmitted by the output surface 51.

Figure 6:
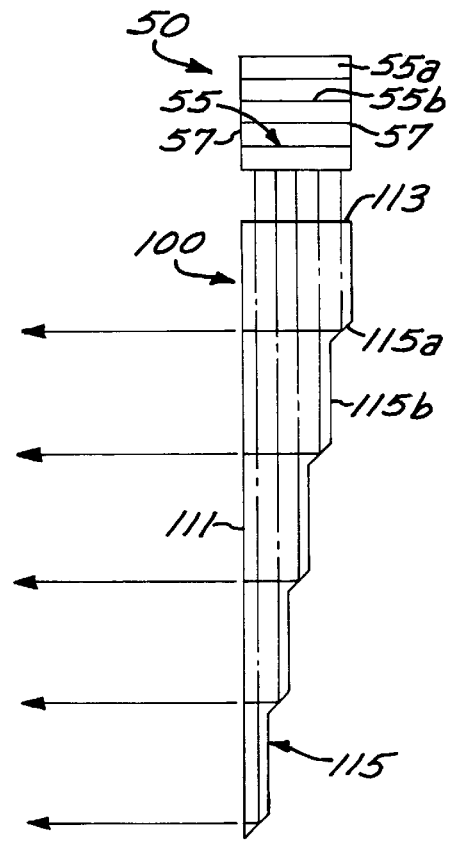
FIG. 6 is a schematic elevational view of the light pipe of the rear exterior vehicle lamp of FIG. 5.
Figure 5:
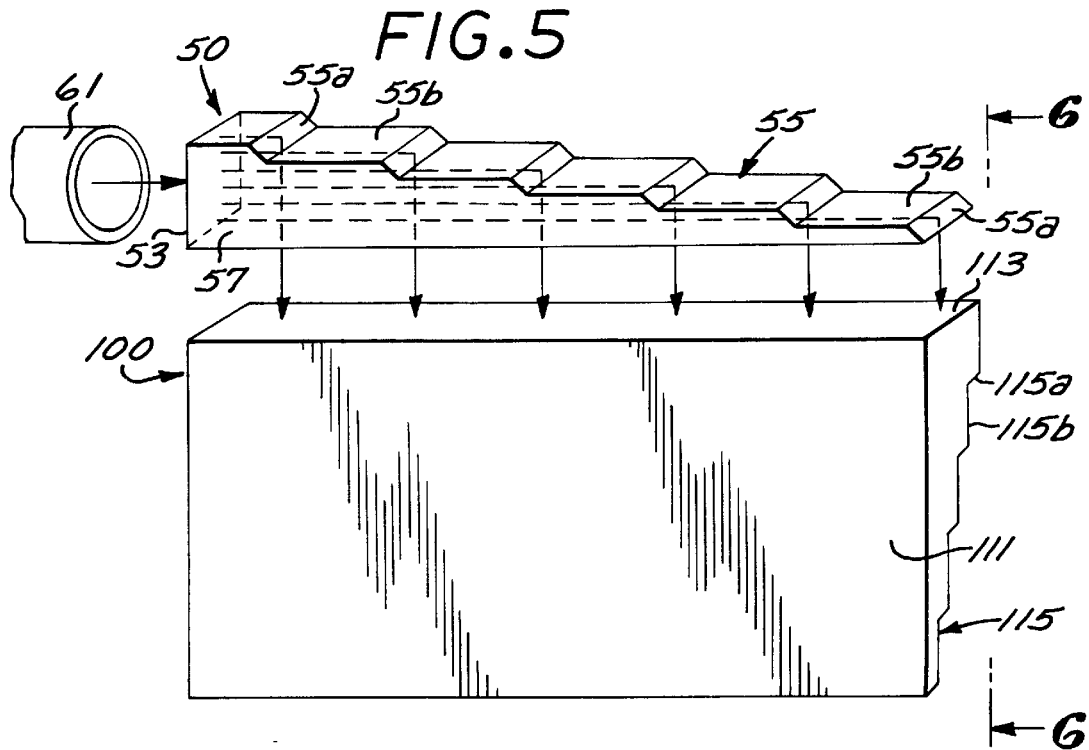
FIG. 5 is a schematic perspective view of a further rear exterior vehicle lamp that can be utilized in the distributed exterior lamp system of FIG. 1.

Referring now to FIGS. 5 and 6, schematically set forth therein are a rear perspective view and a side elevational view of a further rear exterior vehicle lamp that can utilized in the distributed exterior lamp system of FIG. 1. The rear exterior lamp includes a thin transparent tapered light pipe 100 having an output surface 111, an input surface 113 that is orthogonal to the output surface 111, and an internally reflecting side 115. An optical coupler 50 that is substantially identical to the optical coupler 50 of FIGS. 2, 3 and 4 injects light into the input surface 113 of the light pipe 100, and a portion of the injected light is internally reflected by the internally reflecting side 115 toward the output surface 111. The light reflected toward the output surface 111 is incident on the output surface 111 at close to normal, and is efficiently transmitted by the output surface 111 to provide rear exterior lamp illumination.

The output surface 51 of the light coupler 50 is separated by a gap from the input surface 113 of the light pipe 100 so as to confine the light injected into the optical coupler 50 by total internal reflection until portions of the injected light are reflected toward the output surface 51 by the internally reflecting surfaces 55a.

The internally reflecting side 115 of the light pipe 100 more particularly includes a plurality of parallel internally reflecting surfaces 115 for internally reflecting portions of the light injected into the light pipe 100 toward the output surface 111. The plurality of parallel internally reflecting surfaces 115a are orthogonal to a plane that is orthogonal to the planar output surface 111 and parallel to the optical axis of the injected light in the light pipe 100, and are angularly disposed to generally face the input surface 113 and the output surface 111 so as to reflect toward the output surface 111 light that is injected into the light pipe 100 by the optical coupler 50. The light pipe 100 thus functions as a light panel that provides rear exterior illumination in response to light that is communicated via the optical fiber 61 and the optical coupler 50.

The internally reflecting surfaces 115a are spaced apart along the extent of the optical axis of the injected light in the light pipe 100, and are at stepwise progressively closer distances to the output surface 111 with increasing distance from the input surface 113. The internally reflecting surfaces 115a are separated by separation surfaces 115b that are parallel to the output surface 111, whereby the internally reflecting surfaces 115a are adjoining when viewed along the optical axis of the injected light in the tapered light pipe 100. Effectively, the internally reflecting side 115 of the light pipe 100 comprises a stepped surface having a series of internally reflecting surfaces 115a that are located at positions that are stepwise closer to the output surface 111 with distance from the input surface 113, and a series of separation surfaces 115b that are parallel to the output surface 111 and interconnect adjacent edges of adjacent internally reflecting surfaces.

By way of illustrative example, the input surface 113 is orthogonal to the output surface 111, and the internally reflecting surfaces 115a are orthogonal to a plane that is orthogonal to both the input surface 113 and the output surface 111 and are angularly disposed at about 45 degrees relative to the output surface 111.

The foregoing has thus been a disclosure of a distributed exterior lamp system that utilizes a light source which provides light for a plurality of lamps and which is advantageously located remotely from the lamps.

Although the foregoing has been a description and illustration of specific embodiments of the invention, various modifications and changes thereto can be made by persons skilled in the art without departing from the scope and spirit of the invention as defined by the following claims.

What is claimed is:

1. An exterior lamp system for a vehicle, comprising:
a light source for providing a plurality of light beams;

a plurality of optical fiber channels responsive to said light source for providing a plurality of optical fiber channel outputs;

a plurality of LCD switches for controlling the transition of light in the optical fiber channels;

a plurality of exterior lamps respectively responsive to said optical fiber channel outputs for projecting light received from said optical fiber channels to provide respective exterior lamp outputs.

2. The exterior lamp system of claim 1 wherein said light source comprises a high intensity discharge bulb.

3. The exterior lamp system of claim 1 wherein each of said exterior lamps comprises:

an optical coupler responsive to an optical fiber channel output for providing an optical coupler light output; and a light panel responsive to the optical coupler light output for providing an exterior lamp output.

4. The exterior vehicle lamp of claim 3 wherein said light panel comprises:

a light pipe having first and second opposing surfaces;

a rear exterior lamp hologram attached to one of said first and second opposing surfaces of said light pipe;

holographic coupling means attached to one of said first and second opposing surfaces of said light pipe for coupling said optical coupler light output into said light pipe such that a portion of said optical coupler light output propagates by internal reflection within said light pipe.

5. The exterior vehicle lamp of claim 3 wherein said light panel comprises:

a light transmissive substrate;

an input surface formed on said substrate for receiving said optical coupler light output;

an output surface formed on said substrate;

a plurality of internally reflecting surfaces formed on said substrate opposite said output surface for internally reflecting light that enters said substrate at said input surface toward said output surface;

whereby a portion of the light that enters said substrate through said input surface is internally reflected toward said output surface and exits said output surface.

6. The exterior lamp system of claim 3 said optical coupler comprises a transparent substrate having an input side for receiving an optical fiber light output, an output surface and a plurality of internally reflecting surfaces opposite an output surface for internally reflecting light that enters said input surface toward said output surface.

7. An exterior lamp system for a vehicle, comprising:

a light source for providing a plurality of light beams;

a plurality of optical fiber channels responsive to said light source for providing a plurality of optical fiber channel outputs;

a plurality of PDLC switches for controlling the transmission of light in the optical fiber channels;

a plurality of exterior lamps respectively responsive to said optical fiber channel outputs for projecting light received from said optical fiber channels to provide respective exterior lamp outputs.

8. The exterior lamp system of claim 7 wherein said light source comprises a light intensity discharge bulb.

9. The exterior lamp system of claim 7 wherein each of said exterior lamps comprises:

an optical coupler responsive to an optical fiber channel output for providing an optical coupler light output; and a light panel responsive to the optical coupler light output for providing an exterior lamp output.

10. The exterior vehicle lamp of claim 9 wherein said light panel comprises:

a light pipe having first and second opposing surfaces;

a rear exterior lamp hologram attached to one of said first and second opposing surfaces of said light pipe;

holographic coupling means attached to one of said first and second opposing surfaces of said light pipe for coupling said optical coupler light output into said light pipe such that a portion of said optical coupler sight output propagates by internal reflection within said light pipe.

11. The exterior vehicle lamp of claim 9 wherein said light panel comprises:

a light transmissive substrate;

an input surface formed on said substrate for receiving said optical coupler light output;

an output surface formed on said substrate;

a plurality of internal reflecting surfaces formed on said substrate opposite said output surface for internally reflecting light that enters said substrate at said input surface toward said output surface;

whereby a portion of the light that enters said substrate though said input surface is internally reflected toward said output surface and exits said output surface.

12. The exterior lamp system of claim 9 said optical coupler comprises a transparent substrate having an input side for receiving an optical fiber light output, an output surface and a plurality of internally reflecting surfaces opposite said output surface for internally reflecting light that enters said input surface toward said output surface.

* * * * *